(12) United States Patent
Matsumoto

(10) Patent No.: US 6,791,286 B2
(45) Date of Patent: Sep. 14, 2004

(54) HID LAMP OPERATING CIRCUIT

(75) Inventor: Minoru Matsumoto, Ibaraki (JP)

(73) Assignee: Iwasaki Electric Co., Ltd., Tokyo (JP)

( * ) Notice: Subject to any disclaimer, the term of this patent is extended or adjusted under 35 U.S.C. 154(b) by 0 days.

(21) Appl. No.: 10/381,049

(22) PCT Filed: Sep. 26, 2001

(86) PCT No.: PCT/JP01/08358

§ 371 (c)(1),
(2), (4) Date: May 27, 2003

(87) PCT Pub. No.: WO02/28151

PCT Pub. Date: Apr. 4, 2002

(65) Prior Publication Data

US 2004/0095079 A1 May 20, 2004

(51) Int. Cl.⁷ .............................................. G05F 1/00
(52) U.S. Cl. ....................... 315/308; 315/307; 315/219; 315/224; 315/209 R; 315/DIG. 7
(58) Field of Search ................................ 315/308, 307, 315/224, 247, 219, 291, 290, 209 R, 362, DIG. 7; 363/17, 21.18, 34, 98, 97

(56) References Cited

U.S. PATENT DOCUMENTS

| | | | |
|---|---|---|---|
| 4,356,433 A | * 10/1982 | Linden | ........................ 315/308 |
| 5,434,479 A | 7/1995 | Ohnishi et al. | ......... 315/209 R |
| 5,442,257 A | 8/1995 | Mitsumoto | ................... 315/129 |
| 5,959,410 A | * 9/1999 | Yamauchi et al. | ....... 315/209 R |
| 6,130,831 A | 10/2000 | Matsunaga | ................... 363/98 |

FOREIGN PATENT DOCUMENTS

| | | |
|---|---|---|
| JP | 57168499 | 10/1982 |
| JP | 59-12598 | 1/1984 |
| JP | 62-88293 | 4/1987 |
| JP | 1-298687 | 12/1989 |
| JP | 4-253182 | 9/1992 |
| JP | 6-104090 | 4/1994 |
| JP | 6-111985 | 4/1994 |
| JP | 6-119983 | 4/1994 |
| JP | 6-260293 | 9/1994 |
| JP | 2000-134943 | 5/2000 |

OTHER PUBLICATIONS

U.S. patent application 10/381,048 to Matsumoto, May 27, 2003.*
English Language Abstract of JP 2000–134943.
English Language Abstract of JP 6–111985.
English Language Abstract of JP 1–298687.
English Language Abstract of JP 4–253182.
Partial English translation of JP–62–88293.
Partial English translation of JP–57–168499.
Partial English translation of JP–59–12598.

* cited by examiner

Primary Examiner—Haissa Philogene
(74) Attorney, Agent, or Firm—Greenblum & Bernstein, P.L.C.

(57) ABSTRACT

A lighting circuit for an HID lamp causing no erroneous operation of a lighting circuit even when counter-electromotive force is generated due to the inductance in the wirings when the lighting circuit and the HID lamp are located at a long distance and not causing flicker even when the inter-electrode resistance of the HID lamp differs depending on the direction of the application voltage, comprising a control section (C) adapted, upon application of an AC rectangular wave voltage to an HID lamp (1) by a full-bridge type inverter (9), for detecting a resistance value in a positive direction and a resistance value in a negative direction of the HID lamp (1) corresponding to the direction of the polarity of the AC rectangular wave voltage, setting the duty ratio between the positive direction and the negative direction of the AC rectangular waveform voltage so as to be in an inverse proportion with the magnitude for each of the resistance values, and switching each of the switching elements (12A–12D) of the inverter (9) so as to form a voltage waveform to be kept at a ground potential for a predetermined period of time when the direction of the AC rectangular waveform voltage is inverted.

5 Claims, 6 Drawing Sheets

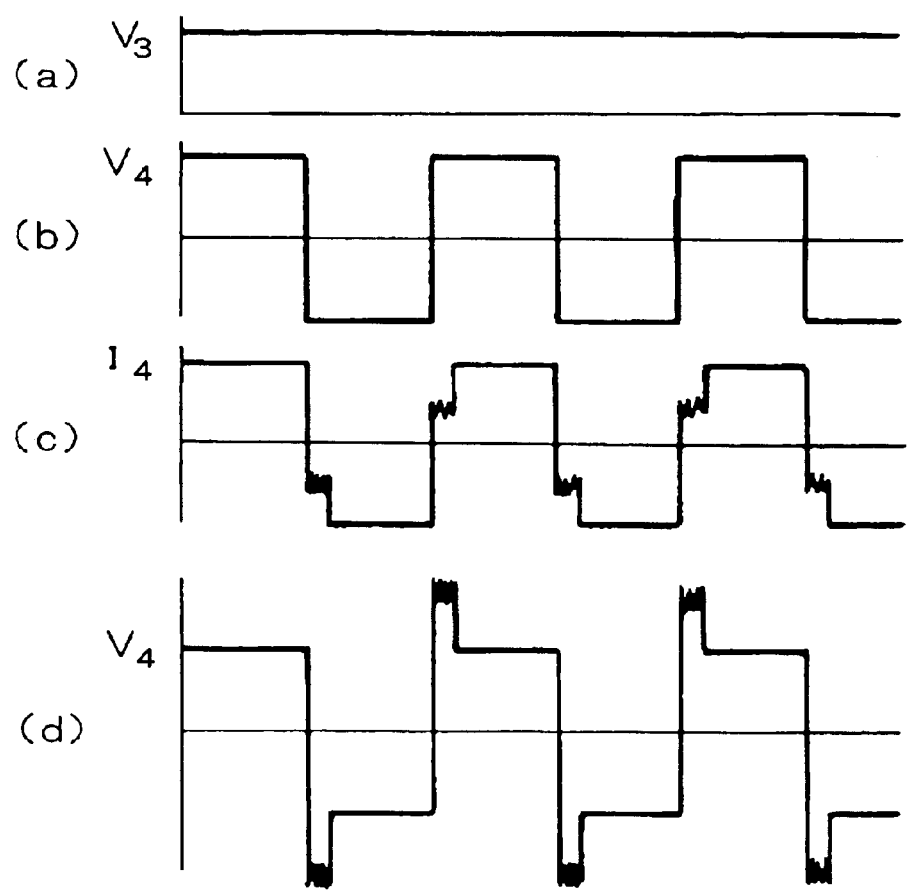

US 6,791,286 B2

HID LAMP OPERATING CIRCUIT

TECHNICAL FIELD

The present invention concerns a lighting circuit for HID lamps such as metal halides lamps used for illumination of indoor commercial facilities such as stores and outdoors facilities, light sources for liquid crystal projectors and headlights for use in automobiles or like other vehicles.

BACKGROUND ART

HID lamps (High Intensity Discharge Lamps) are also referred to as high luminance discharge lamps or high-pressure discharge lamps and since they are not only excellent in light emission efficiency relative to consumption power but also generate less amount of heat for an identical amount of light and have higher safety compared, for example, with halogen lamps, they have been used, in recent years, in a case where light sources of high luminance are required such as in illumination for indoor commercial facilities and outdoor facilities.

The HID lamp starts discharge by the application of a high voltage at about several kV upon starting and, continues discharge subsequently by applying a relatively low lamp voltage of several tens to several hundreds volts and the HID lamps is put in a lighted state along with increasing lamp voltage.

FIG. 9 shows a general light circuit 41 of lighting an HID lamp by an AC rectangular wave voltage and it comprises a main circuit 2 for applying a lamp voltage at several tens to several hundreds volts to an HID lamp 1, and a starting circuit 3 for applying a high starting voltage at several kilo volts.

The main circuit 2 comprises a rectifier circuit 5 for full wave rectification of a sinusoidal AC wave supplied from an AC power source 4, a power factor improving circuit 6 for converting a rectified pulsative voltage into a smooth DC voltage, a power control circuit comprising a chopper circuit 7A for converting the smooth DC voltage into rectangular pulses of a predetermined pulse width and a smoothing circuit 7B for smoothing the rectangular pulses again into a DC lamp voltage at a predetermined voltage value, and an inverter 9 for converting the obtained DC lamp voltage into an AC rectangular wave voltage at a voltage identical therewith, and the inverter 9 is connected by way of the starting circuit 3 to the HID lamp 1.

FIG. 10(a) shows a waveform of a lamp voltage $V_3$ inputted to the inverter 9, and FIG. 10(b) shows a waveform of an AC rectangular wave voltage $V_4$ outputted from the inverter 9.

The starting circuit 3 has a step-up transformer (not illustrated), which generates a high starting voltage at about several kilo volts so as to start discharge between electrodes of the HID lamp 1 when a lighting switch (not illustrated) of the HID lamp 1 is turned on.

Accordingly, in the lighting circuit 41, when the lighting switch (not illustrated) is turned on, a starting voltage at several kilo volts is applied to the HID lamp 1 to start discharge and, subsequent to the start of the discharge, discharge continues by the application of a relatively low lamp voltage of several tens to several hundreds volts supplied from the main circuit 2 and the lamp voltage increases gradually to put the HID lamp into a lighted state.

However, in a case of using the lighting circuit 41 described above, while there are no troubles where the distance of a wiring from the lighting circuit 41 to the HID lamp 1 is as short as within 2 m, erroneous operation may possibly be caused to the lighting circuit 41 as the distance increases.

Particularly, in a large retail store having a large shopping area per one floor such as a department store or supermarket, it is highly demanded to centralize various switches on one operation panel for enabling remote operation.

In such a case, for preventing erroneous operation of the lighting circuits 41, it is necessary that only the switches are located on the operation panel, while respective ignition circuits 41 are located near the respective HID lamps 1. This makes the wiring operation troublesome and makes the repair upon failure of the lighting circuit 41 also troublesome.

Accordingly, as a result of experiments and studies for analyzing the cause for the erroneous operation in the lighting circuit 41, it has been found that the inductance of wirings is not negligible when the wiring length increases, magnetic field energy is accumulated to the inductance of the wirings when the AC rectangular wave voltage is supplied from the main circuit 2 to the HID lamp 1, which causes counter-electromotive force on every inversion of the polarity of the voltage to reduce the voltage and the current to zero.

Then, the current forms an inverted spike waveform as shown in FIG. 10(c) by the counter-electromotive force, and the lamp voltage is increased instantaneously for recovery to form a spiked waveform as shown in FIG. 10(d), which causes erroneous operation of the lighting circuit 41.

For example, in a case of detecting a voltage applied to the main circuit 2 intending to control the lamp circuit, if the peak voltage of the spike wave should be detected, since a voltage abnormally higher than usual is detected, power control can not be conducted exactly.

On the other hand, it has been found during the experiment that the HID lamp 1 flickers in a case where the wirings are relatively short and spike waves described above are not formed.

This can not be considered as the erroneous operation of the lighting circuit 41, and the analysis for the cause has revealed that this is attributable to the characteristics of the HID lamp 1.

That is, it has been found that this dues to the difference of the resistance value, in a case of discharging the HID lamp 1 under inversion of polarity between electrodes, between a case of discharging from one electrode to the other electrode (positive direction) and a case of discharging from the other electrode to the one electrode (negative direction) even when structural characteristics and electrical characteristics of the electrodes are quite identical.

Then, it has been confirmed that when the voltage is applied in the direction of a larger resistance value, the position of an arc spot on the electrode is not stable but tends to be displaced to fluctuate the arc between the electrodes and cause flickering.

In view of the above, it is a technical subject of the present invention to prevent the lighting circuit from erroneous operation if counter-electromotive force should occur by magnetic field energy accumulated in the inductance of wirings in a case where a lighting circuit and an HID lamp are located at a long distance, and enable lighting with less flicker even when the inter-electrode resistance of the HID lamp is different depending on the polarity.

DISCLOSURE OF THE INVENTION

This invention provides a lighting circuit for an HID lamp in which a DC voltage supplied to a full-bridge type inverter having four switching elements is converted into an AC rectangular wave voltage at a predetermined frequency and applied to the HID lamp, comprising a control section for detecting a value of a current flowing in the HID lamp, calculating a resistance value in a positive direction and a resistance value in a negative direction of the lamp corresponding to the direction of the polarity of the AC rectangular wave voltage based thereon, setting a duty ratio between the positive direction and the negative direction of the AC rectangular wave voltage so as to be in an inverse proportion with the magnitude for each of the resistance values, and outputting a polarity control signal that switches each of the switching elements at a predetermined timing such that the voltage value is kept at a ground potential for a predetermined period of time when the direction of the AC rectangular waveform voltage is inverted.

According to the present invention, since the full bridge type inverter is used, the inputted constant DC voltage is converted into an AC rectangular wave voltage at a predetermined frequency by supplying polarity control signals so as to turn switching elements of each pair ON and OFF alternately, with two switching elements positioned orthogonally to each other being as a pair.

In this step, the value of the current flowing in the HID lamp is detected, the resistance value in the positive direction and the resistance value in the negative direction of the lamp corresponding to the polarity direction of the AC rectangular wave voltage are calculated based thereon, and a control signal is outputted such that the duty ratio between the positive direction and the negative direction of the AC rectangular wave voltage is in an inverse proportion with the magnitude of each resistance value.

Thus, for the duty ratio in the positive direction and the negative direction of the AC rectangular wave voltage, the polarity with the higher resistance value is decreases while the polarity with the lower resistance value decreases.

Accordingly, the period of time during which a voltage with a polarity of larger resistance value is shortened to cause less flicker by fluctuation.

Further, by switching the switching elements of each pair ON and OFF at a predetermined timing, an interval of keeping the voltage value to the ground potential only for a predetermined period of time (for example $\frac{1}{10}$ of one period) is formed when the direction of the AC rectangular wave voltage is inverted.

Accordingly, while the counter-electromotive force tending to keep the voltage so far is generated at the instance the AC rectangular wave voltage outputted from the inverter is reduced to the earth potential, since the current is released as it is to the ground, it does not form a spike wave that would cause erroneous operation in the lighting circuit.

BRIEF EXPLANATION OF THE DRAWINGS

FIG. 10 is a waveform chart showing the voltage and the current therein.

BEST MODE FOR PRACTICING THE INVENTION

An embodiment of the present invention is to be described specifically with reference to the drawings.

Figure 1:
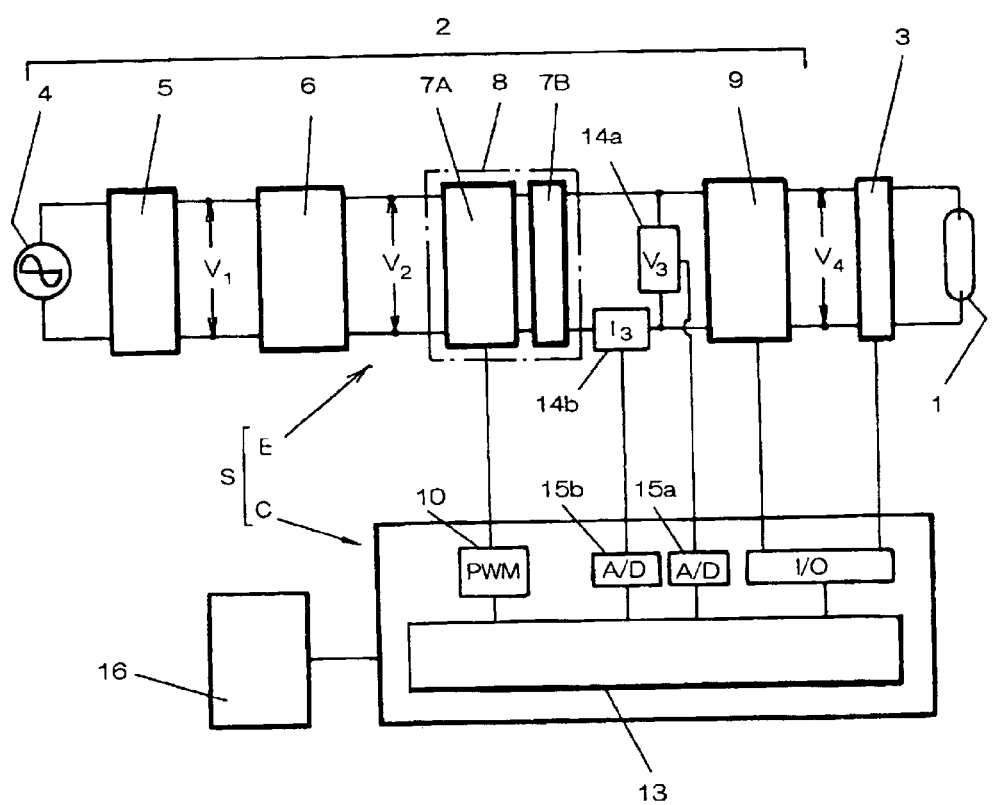
FIG. 1 is a block diagram showing a lighting circuit for an HID lamp according to the present invention.
Figure 2:
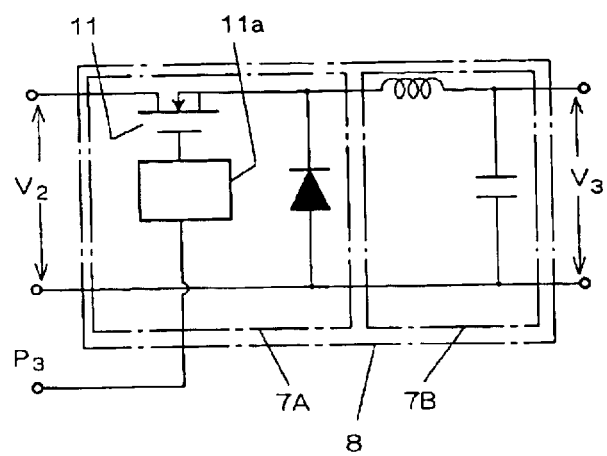
FIG. 2 is a circuit diagram showing a lamp power control circuit.
Figure 3:
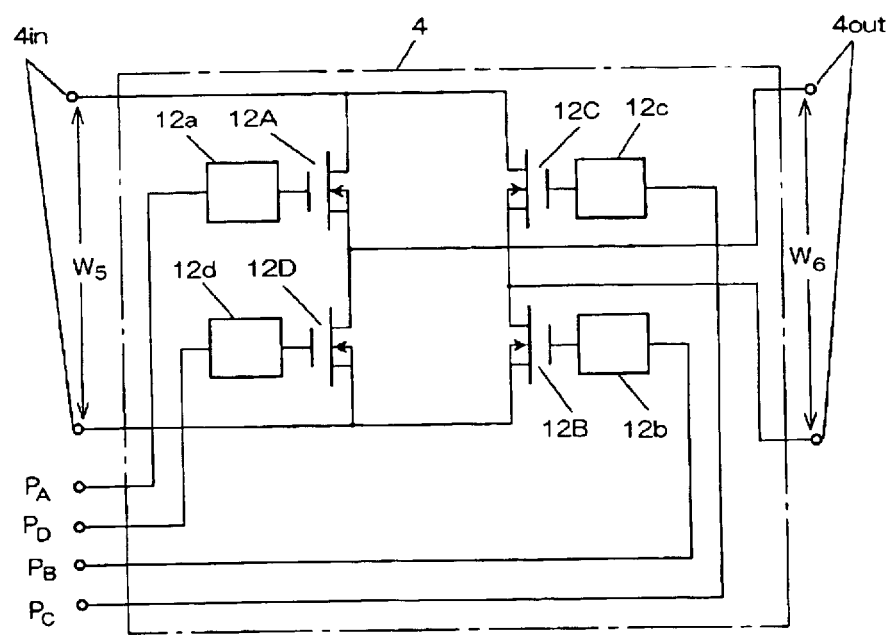
FIG. 3 is a circuit diagram showing an inverter.

A lighting circuit S shown in FIG. 1 comprises a power source circuit E for lighting an HID lamp 1 and a control section C for controlling the power source circuit E, and the power source circuit E has a main circuit 2 for applying a lamp voltage at a relatively low voltage value of several tens to several hundreds volts to the HID lamp 1 and a starting circuit 3 for instantaneously applying a high starting voltage of several kilo volts when a start switch is turned-on.

The main circuit 2 comprises a rectifier circuit 5 for full wave rectification of a sinusoidal AC voltage supplied from a AC power source 4, a power factor improving circuit 6 for converting a full-wave rectified pulsative voltage $V_1$ into a smooth DC voltage $V_2$ while supplying a current of a waveform similar therewith, a lamp power control circuit 8 comprising a chopper circuit 7A for controlling the supplied power by converting the smooth DC voltage $V_2$ into rectangular pulses of a predetermined pulse width and a smoothing circuit 7b for smoothing the rectangular pulses again into a lamp voltage $V_3$ at a predetermined voltage value, and a full bridge type inverter 9 for converting the obtained lamp voltage $V_3$ into an AC rectangular wave voltage $V_4$ at a potential equal therewith, and the inverter is connected by way of the starting circuit 3 with the HID lamp 1.

The lamp power control circuit 8 is adapted to convert the smooth DC voltage $V_2$ inputted from the power factor improving factor 6 by the chopper circuit 7A at the prestage into rectangular pulses of a predetermined pulse width and then smooth the same by the smoothing circuit 7B at the subsequent stage to output, for example, a lamp voltage $V_3$ in accordance with the rated power.

Specifically, an FET (Field Effect Transistor) 11 disposed to the chopper circuit 7 is turned ON and OFF by the voltage control pulse signal supplied from a PWM control circuit 10 of the control section to be C described later by way of a driver 11a to output rectangular pulses of a pulse width corresponding to the lamp voltage $V_3$.

Further, the inverter 9 is formed as a full bridge type having four FETs (Field Effect Transistors) 12A–12D as switching elements in which the lamp voltage $V_3$ applied to an input terminal $V_{in}$ is converted into an AC rectangular waveform voltage $V_4$ and outputted to an output terminal $V_{out}$.

In this case, the AC rectangular wave voltage $V_4$ is converted into a waveform having an interval during which the voltage is kept at a ground potential for a predetermined period of time (for example, $\frac{1}{10}$ of one period) when the direction of the voltage is inverted.

Accordingly, when FET 12A and 12B, and 12C and 12D situating orthogonally to each other as respective pairs are switched to ON-OFF on every pair, polarity control signals $P_A$–$P_D$ are supplied from the control section C such that FET 12B and 12A on the side of the ground are in a conduction state and other FET 12A and 12C than those described above are in a not-conduction state.

Since each of the FET 12A–12D is in the conduction state when each of the polarity control signals $P_A$–$P_D$ is at a high level and is in the non-conduction state when each of them is at a low level, each of the control signals $P_A$–$P_D$ is outputted according to the timing at which each of FET 12A–12D is turned ON and OFF.

The control section C comprises a single chip microcomputer 13 and the like in which sensors 14a, 14b for detecting voltage and current supplied to the HID lamp 1 before the inverter 9 are connected by way of A/D converters 15a, 15b at the input thereof, while the inverter 9 is connected to the output and the chopper circuit 7A is connected by way of the PWM control circuit 10.

Then, it outputs a voltage control pulse signal $P_3$ of a predetermined pulse width for operating FET 11 of the chopper circuit 7A to turn ON and OFF and outputs polarity control signals $P_A$–$P_D$ for turning each of the FET 12A–12D to ON and OFF on every pair at a predetermined frequency.

The voltage control pulse signal $P_3$ executes a predetermined processing based on the voltage and current detected by the sensors 14a and 14b, to operate FET 11 to turn-ON and OFF such that a lamp voltage $V_3$ at a predetermined voltage value is outputted from the lamp power control circuit 8.

Figure 4:
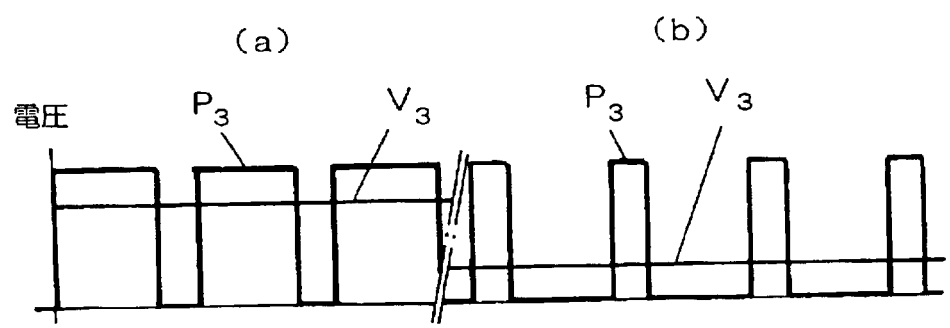
FIG. 4 is a waveform chart showing a voltage control pulse signal.

In a case of setting a higher lamp power $W_3$, the duty ratio for the voltage control pulse signal $P_3$ may be controlled such that the high level duration time is longer as shown in FIG. 4(a), whereas in a case of setting a lower lamp power $W_3$, the duty ratio for the voltage control pulse signal $P_3$ may be controlled such that the high level duration time is shorter as shown in FIG. 4(b).

Then feedback control may be applied such that the product of the voltage value detected by the sensor 14a and the current value detected by the sensor 14b agrees with the predetermined power value.

Figure 5:
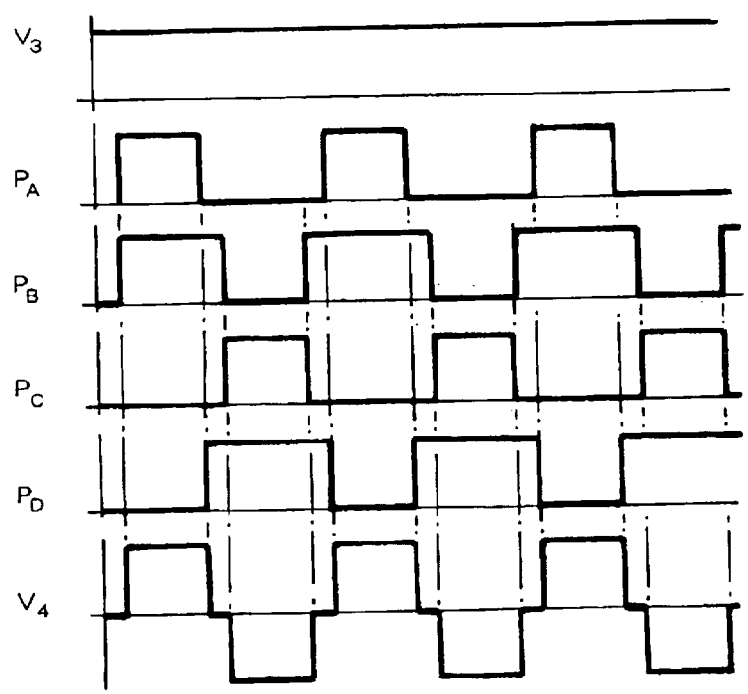
FIG. 5 is a waveform chart showing a polarity control signal and an input/output voltage.

The polarity control signals $P_A$–$P_D$ for turning the FET 12A–12D of each pair to ON and OFF are switched successively for the high level and the low level as shown in FIG. 5, to render a pair of FET 12A and 12B situating orthogonally conductive, and another pair of FET 12C and 12D not conductive when the voltage in the positive direction is outputted.

Then, in the interval period, FET 12B and 12D on the side of the ground are conducted while other FET 12A and 12C are not conducted.

Then, when the voltage in the negative direction is outputted, a pair of FET 12A and 12B situating orthogonally are rendered not conductive, and another pair of FET 12C and 12D are rendered conductive.

Thus, the AC rectangular wave voltage $V_4$ is kept at the ground level for a predetermined time when the direction of the voltage is inverted.

16 denotes a communication computer which controls the lighting circuit S based on the control signal sent from an external equipment (not illustrated), or relays signals between the external equipment and the control section C corresponding to complicate communication protocols when various control data for the lighting circuit S are sent to the host computer.

Thus, burden of the data processing on the control section C can be moderated to reliably conduct control for the lighting circuit S.

Figure 6:
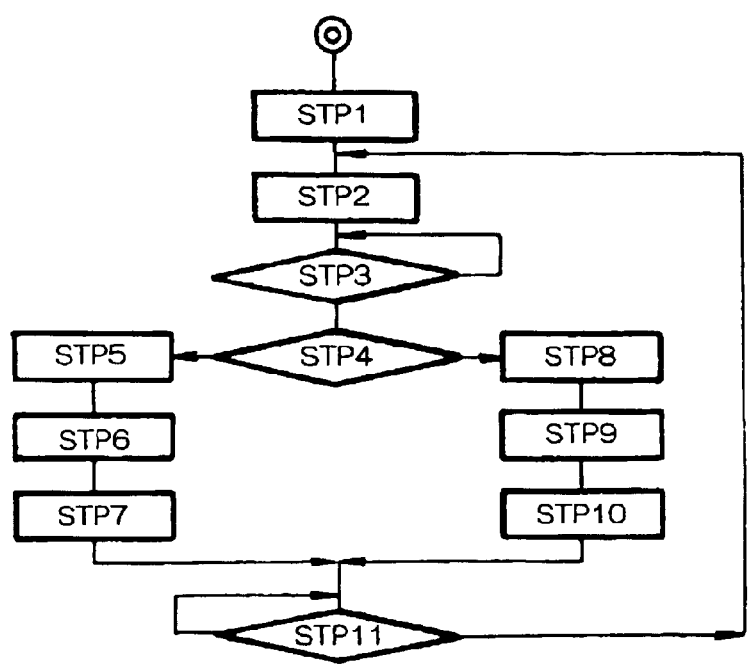
FIG. 6 is a flow chart showing a processing procedures for forming an AC rectangular wave voltage.

FIG. 6 is a flow chart showing processing procedures for forming an AC rectangular wave voltage in the control section C.

When a main switch (not illustrated) is turned ON, AC rectangular wave voltage forming processing is executed in the single chip microcomputer 13.

At first, in the processing, a half-period identification variant is set as: INV=0 at step STP1, and all polarity control signals $P_A$–$P_D$ are outputted each at a low level at step STP2.

Then, it waits till lapse of a predetermined interval time at step STP3, and goes to step STP4 at the instance of lapse and it is judged whether the variant INV=0 or not.

Then, if variant INV=0, it goes to STP5, outputs the polarity control signals $P_A$ and $P_B$ at high level and the polarity control signals $P_C$ and $P_D$ at low level, reads out a positive direction application time $T_{(0)}$ at the instance at step STP6, and sets the variant as: INV=1 at step STP7 and then goes to step STP11.

On the other hand, if it is judged that the variant INV is not equal with zero at step STP4, it goes to step STP8, outputs the polarity control signals $P_A$ and $P_B$ at a low level, and the polarity control signals $P_C$ and $P_D$ at high level, it reads out the negative direction application time $T_{(1)}$ at the instance at step STP6, sets the variant as: INV=0 at step STP10 and then goes to step STP11.

At step STP11, it waits till the time obtained by subtracting the interval time from each read application times $T_{(INV)}$, returns to step STP2 at the time of elapse and then continues processing till the main switch is turned-OFF.

Figure 7:
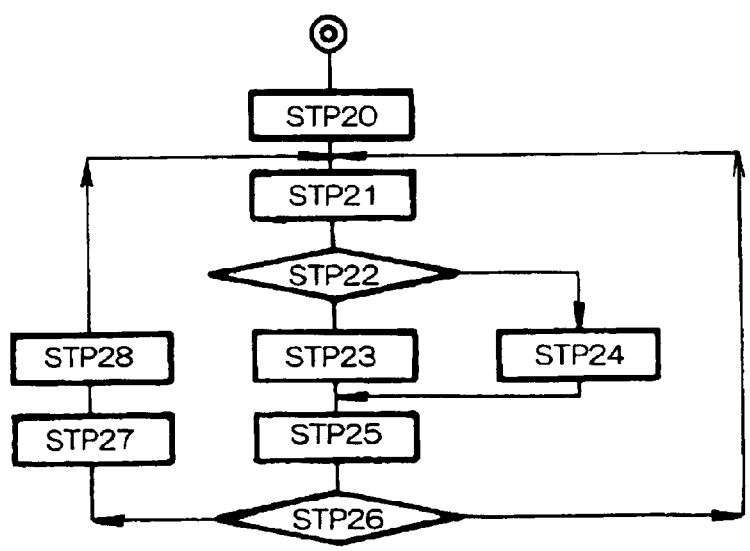
FIG. 7 is a flow chart showing processing procedures for setting duty ratio/voltage.

Further, FIG. 7 is a flow chart showing duty ratio/voltage setting processing procedures in the control section C.

When the main switch (not illustrated) is turned-ON, the single chip microcomputer 13 executes the duty ratio/voltage setting processing in parallel with the AC rectangular wave voltage forming processing.

At first, at step STP20, the positive direction application time $T_{(0)}$ and the negative direction application time $T_{(1)}$ of the AC rectangular wave voltage $V_4$ are set respectively to ½ of the time T for 1 period of the AC rectangular wave voltage $V_4$.

$$T_{(0)}=T_{(1)}=(½)T$$

Then, at step STP21, it reads a current value $I_{(INV)}$ inputted from the sensor 14b and, when it judges as $I_{(INV)}>0$ at step STP22, it sets as: INV=0 at step STP23. When it judges as: $I_{(INV)}<0$ at step STP22, it sets as: INV=1 at step STP24, then it goes to step STP25 to calculate the positive direction resistance and the negative direction resistance $R_{(INV)}$ of the HID lamp 1 according to the following equation:

$$R_{(INV)}=W/(I_{(INV)})^2$$

INV=1 or 0

W: rated power of HID lamp 1

Then, it judges at step STP26 whether $R_{(0)}$, $R_{(1)}$ are calculated or not and when not both of $R_{(0)}$ and $R_{(1)}$ are calculated, processings in steps STP21–25 are conducted to conduct calculation for another. When both of them are calculated, it calculates at step STP27 the duty ratio of the AC rectangular wave voltage $V_4$ and an aimed lamp voltage $V_{(INV)}$ to be applied to the HID lamp 1 at step STP27.

At first, the duty ratio is calculated according to:

$$T_{(0)}/T_{(1)}=R_{(1)}/R_{(0)}$$

Assuming the time for one period of the AC rectangular voltage $V_4$ as T, since $$T=T_{(0)}+T_{(1)},$$

the respective application times T for the positive direction and the negative direction are calculated according to:

$$T_{(INV)}=T\times R_{(INV)}/(R_{(1)}+R_{(0)})$$

Further, based on the detected current $I_{(INV)}$ and the calculated resistance value $R_{(INV)}$, the aimed lamp voltage $V_{(INV)}$ is calculated as an absolute value for the product thereof as:

$$V_{(INV)}=ABS(I_{INV}\times R_{(INV)})$$

The result of the calculation described above is rewritten on every time, and the application time $T_{(INV)}$ and the aimed lamp voltage $V_{(INV)}$ at each instance are temporarily stored in a predetermined memory region.

Then, it goes to step STP28 to read the values and controls the voltage inversion timing for the AC rectangular wave voltage $V_4$ and, simultaneously, controls the lamp voltage $V_3$ outputted from the lamp power control circuit 8.

Thus, the voltage control pulse signals are outputted to FET 11 of the chopper circuit 7A so as to be identical with $V_{(INV)}$ synchronously with the voltage inversion period of the AC rectangular wave voltage $V_4$ and the application voltages in the positive direction and the negative direction are controlled respectively.

Then, referring to the operation of the present invention, after a high voltage is applied instantaneously from the starting circuit 3 to the HID lamp 1 to start discharge, it continues discharge by the AC rectangular wave voltage $V_4$ at a constant voltage supplied from the writing circuit S to light up the HIP lamp 1.

In this process, the polarity control signals $P_A$–$P_D$ are outputted from the control section C to each of FET 12A–12D of the inverter 9 that converts the DC lamp voltage 3 into the AC rectangular voltage $V_4$.

Figure 8:
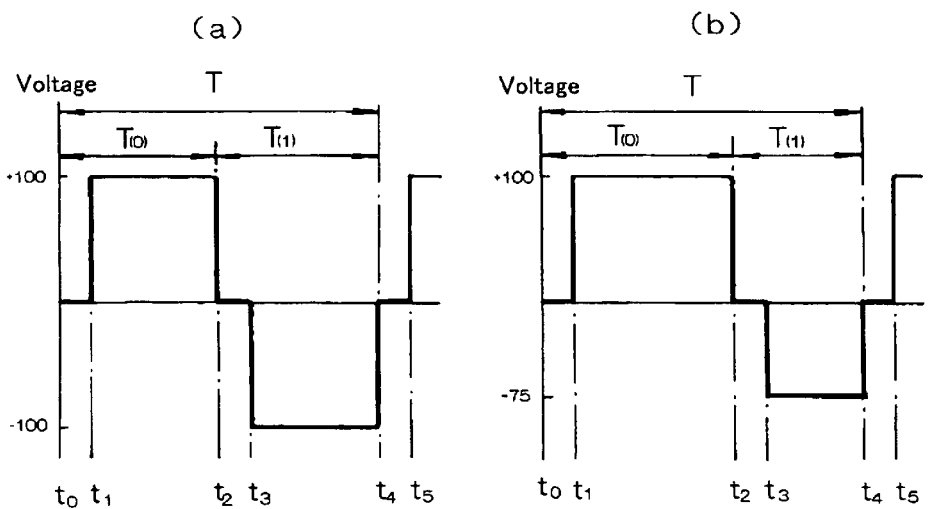
FIG. 8 is a waveform chart showing a detection voltage.
Figure 9:
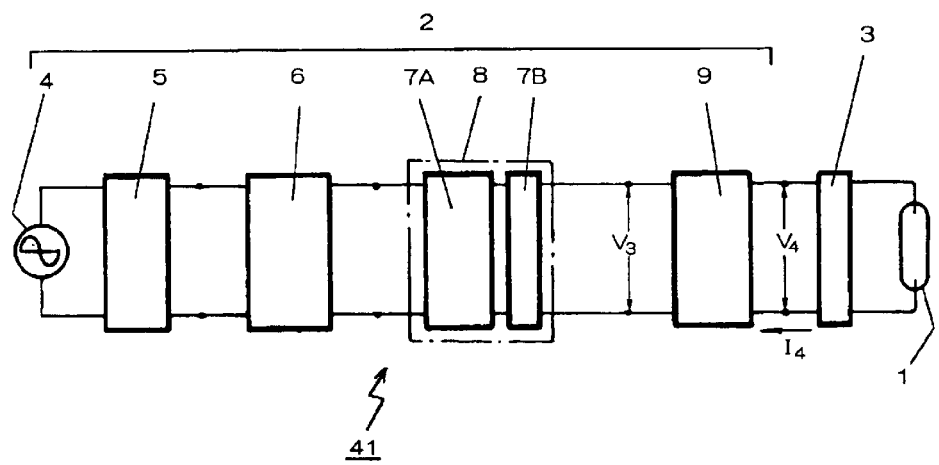
FIG. 9 is an explanatory view showing the general lighting circuit described above.

At first, assuming that the positive direction application time $T_{(0)}$ and the negative application voltage $T_{(1)}$ are set to ½ of an period T for the AC rectangular voltage $V_4$ and the interval is set to 1/10, since FET 12A–12D are rendered not conductive for time $t_0$–$t_1$ corresponding to 1/10 of one period as shown in FIG. 8(a), the AC rectangular wave voltage is maintained as: $V_4=0$.

Then, at time $t_1$–$t_2$ corresponding to 4/10 of one period, since FET 12A and 12B are rendered conductive and FET 12C and 12D are rendered not conductive, a positive AC rectangular voltage $V_4$ is outputted.

Then, since FET 12B and 12D are rendered conductive and FET 12A and 12C are rendered not conductive at time $t_2$–$t_3$ corresponding to 1/10 of one period, a positive AC rectangular voltage $V_4$ is maintained as: $V_4=0$.

Even when a counter-electromotive force of opposite polarity is generated in this process, since FET 12B, 12A on the side of the ground are conducted, the current is released to the ground potential and no spike voltage is generated.

Further, since FET 12A and 12B are rendered not conductive and FET 12C and 12D are rendered conductive for the succeeding time $t_3$–$t_4$ corresponding to 4/10 of one period, the AC rectangular wave voltage $V_4$ is outputted under inversion and, further, since FET 12B and 12D are again rendered conductive and FET 12A and 12C are reduced not conductive for time $t_4$–$t_5$ during which the AC rectangular wave voltage is kept as: $V_4=0$ and the current generated by counter-electromotive force is released to the ground, the spike voltage is not generated in the same manner as described above.

As described above, since the AC rectangular wave voltage $V_4$ is kept at 0 for a predetermined time when the direction of the voltage is inverted, the counter-electromotive force generated in this case is released to the ground potential and, accordingly, spikes causing erroneous operation to the lighting circuit S are not generated even when wirings connecting the lighting circuit S and HIP lamp 1 are made longer to increase the inductance thereof.

Further, as soon as the HID lamp 1 starts lighting, the value $I_{(INV)}$ of a current flowing through the HID lamp 1 is detected by the sensor 14b, and the positive direction resistance value $R_{(0)}$ and the negative direction resistance value $R_{(1)}$ of the lamp 1 corresponding to the polarity direction of the AC rectangular wave voltage $V_4$ are calculated based on the detected value and the rated power of the HID lamp 1.

Assuming the current value when the AC rectangular wave voltage $V_4$ is applied in the positive direction as $I_{(0)}=2(A)$, the value $I_{(1)}$ of the current when it is applied in the negative direction as $I_{(1)}=1.5(A)$, and the rated power of the HID lamp 1 as 150 W:

positive direction resistance $R_{(0)}=W/I^2=150/(2)^2=37.5(\Omega)$ negative direction resistance $R_{(1)}=W/I^2=150/(1.5)^2=66.7(\Omega)$ Further, assuming the time for one period of the AC rectangular voltage $V_4$ as: T=10 ms, positive direction application time $T_{(0)}=T \times R_{(1)}/(R_{(0)}+R_{(1)})=6.4$ ms negative direction application time $T_{(1)}=T \times R_{(0)}/(R_{(0)}+R_{(1)})=3.6$ ms Assuming the interval time as 1/10 of one period=1 ms, the time for the application in the positive direction and the negative direction are actually 5.2 ms and 2.6 ms respectively.

Further, the aimed lamp voltage value $V_{(INV)}$ to be applied to the HID lamp is:

$V_{(0)}=I_{(0)} \times R_{(0)}=75$ V: upon positive direction application $V_{(1)}=I_{(1)} \times R_{(1)}=100$ V: upon negative direction application Accordingly, as shown in FIG. 8(b), the AC rectangular wave voltage $V_4$ applied to the HID lamp 1 is controlled for the application time and the application voltage with respect to the positive direction and the negative direction, respectively.

As described above, when the lamp voltage $V_3$ is applied so as to be identical with the aimed lamp voltage value $V_{(INV)}$, the consumption power is constant between the positive direction application and negative direction application, and flicker can also be prevented effectively.

In this embodiment, description has been made to a case of including the interval time in the positive direction application time $T_{(0)}$ and the negative direction application time $T_{(1)}$ and setting the duty ratio of the AC rectangular wave voltage $V_4$ between the positive direction and the negative direction so as to be in an inverse proportion with the magnitude of each resistance value, it may be also applied to a case of deciding the positive direction application time $T_{(0)}$ and the negative direction application time $T_{(1)}$ by distributing the remaining time after removing the interval time from the time T for one period of the AC rectangular wave voltage $V_4$ to a duty ratio in an inverse proportion with the magnitude of each resistance value.

Industrial Applicability

As has been described above, according to the present invention, even when the counter-electromotive force is generated by the magnetic field energy accumulated in the inductance in the wirings for supplying the AC rectangular wave voltage to the HID lamp, since this is released to the ground while the AC rectangular wave voltage is kept at the ground potential, an inverse spike current or spike voltage attributable thereto that would cause erroneous operation to the lighting circuit is not generated and, accordingly, it can provide an excellent effect that the lighting circuit and the HID lamp can be disposed at a long distance.

Further, since the duty ratio of the AC rectangular wave voltage between the positive direction and the negative direction is determined in an inverse proportion with the positive direction resistance value and the negative direction resistance value of the HID lamp corresponding to the polarity direction, the time in which the voltage of the polarity with larger resistance value is shortened to provide an excellent effect of less causing flicker due to fluctuation of arcs.

What is claimed is:

1. A lighting circuit for an HID lamp in which a DC voltage supplied to a full-bridge type inverter having four switching elements is converted into an AC rectangular wave voltage at a predetermined frequency and applied to the HID lamp, comprising a control section for detecting a value of a current flowing in the HID lamp, calculating a resistance value in a positive direction and a resistance value in a negative direction of the HID lamp corresponding to the direction of the polarity of the AC rectangular wave voltage based thereon, setting the duty ratio between the positive direction and the negative direction of the AC rectangular waveform voltage so as to be in an inverse proportion with the magnitude for each of the resistance values, and outputting a polarity control signal that switches each of the switching elements at a predetermined timing such that the voltage value is kept at a ground potential for a predetermined period of time when the direction of the AC rectangular waveform voltage is inverted.

2. A lighting circuit for an HID lamp as defined in claim 1, comprising a lamp power control circuit for controlling the DC voltage supplied to the inverter synchronously with the timing of reversing the polarity of the DC voltage based on the current value detected on every polarity direction of the AC rectangular wave voltage and each of the resistance values.

3. A lighting circuit for an HID lamp in which a DC voltage supplied to a full-bridge type inverter having four switching elements is converted into an AC rectangular wave voltage at a predetermined frequency and applied to the HID lamp, comprising a control section for detecting a value of a current flowing to the HID lamp, calculating a positive direction resistance value and a negative direction resistance value of the lamp corresponding to the direction of the polarity of the AC rectangular wave voltage based thereon, and outputting a polarity control signal to switch the ON-OFF operation of each of the switching elements such that a duty ratio of the AC rectangular wave voltage between the positive direction and the negative direction is in an inverse proportion with the magnitude of each of the resistance values.

4. A lighting circuit for an HID lamp as defined in claim 3, comprising a lamp power control circuit for controlling the DC voltage supplied to the inverter synchronously with the timing of reversing the polarity of the DC voltage based on the current value detected on every polarity direction of the AC rectangular wave voltage and each of the resistance values.

5. A lighting circuit for an HID lamp in which a DC voltage supplied to a full-bridge type inverter having four switching elements is converted into an AC rectangular wave voltage at a predetermined frequency and applied to the HID lamp, comprising a lamp power control circuit, provided to the input of the inverter, for outputting a power-controlled DC voltage such that a power calculated by voltage·current supplied to the lamp agrees with a predetermined power valve, and comprising;

a control section for outputting a polarity control signal to switch conduction/non-conduction of each of the switching elements at a predetermined timing such that the voltage value for the AC rectangular wave voltage is kept at a ground potential for a predetermined period of time when the direction of the polarity of the voltage is inverted relative to the inverter for converting the DC voltage outputted from the lamp power control circuit into the AC rectangular wave voltage.

* * * * *